Nov. 12, 1929.  E. H. DANIEL  1,735,422
POWER LIFT FOR TRACTORS
Filed March 12, 1928  2 Sheets-Sheet 1
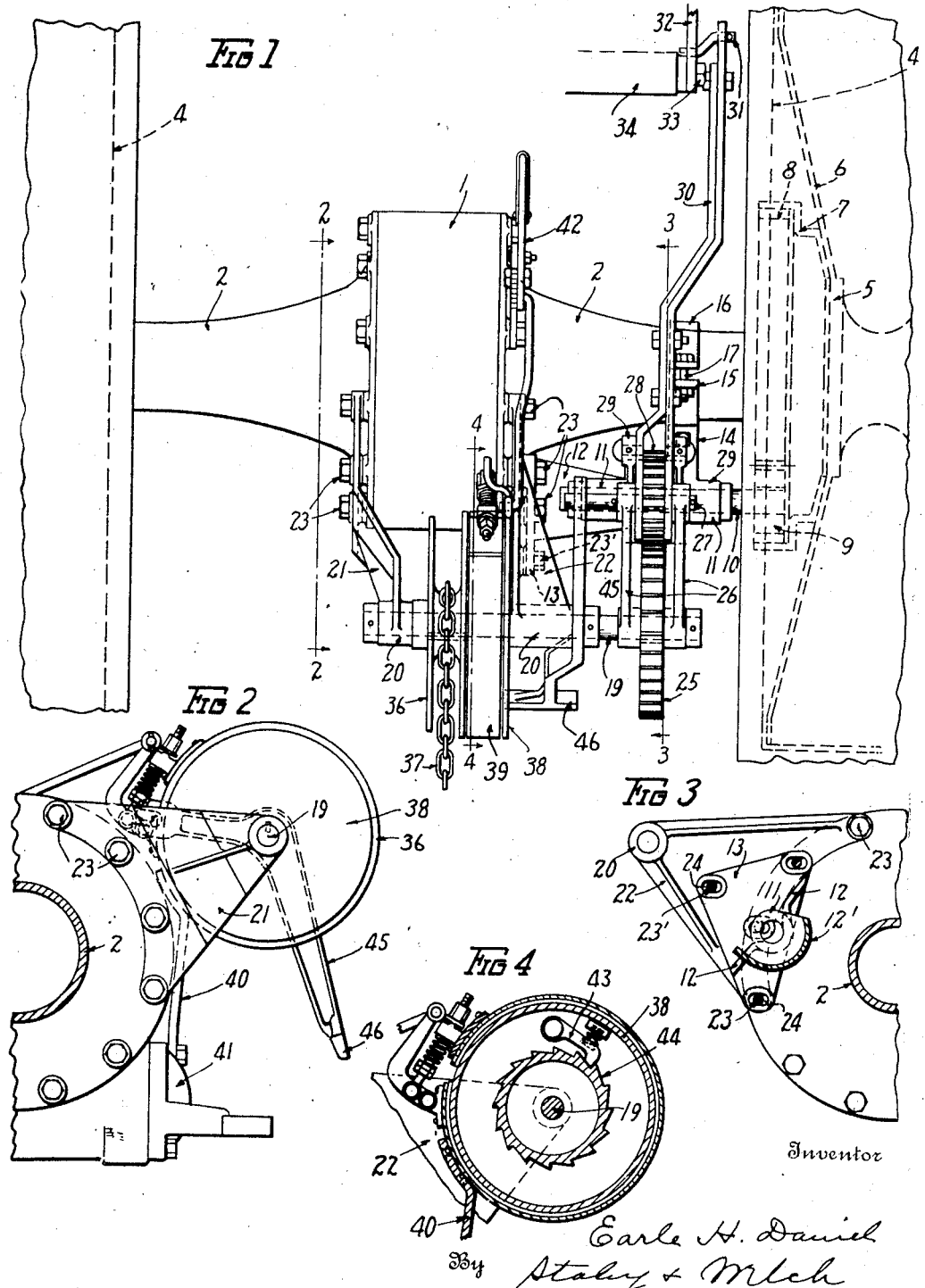
Inventor
Earle H. Daniel
By Staley & Mlch
Attorneys Nov. 12, 1929.   E. H. DANIEL   1,735,422
POWER LIFT FOR TRACTORS
Filed March 12, 1928   2 Sheets-Sheet 2
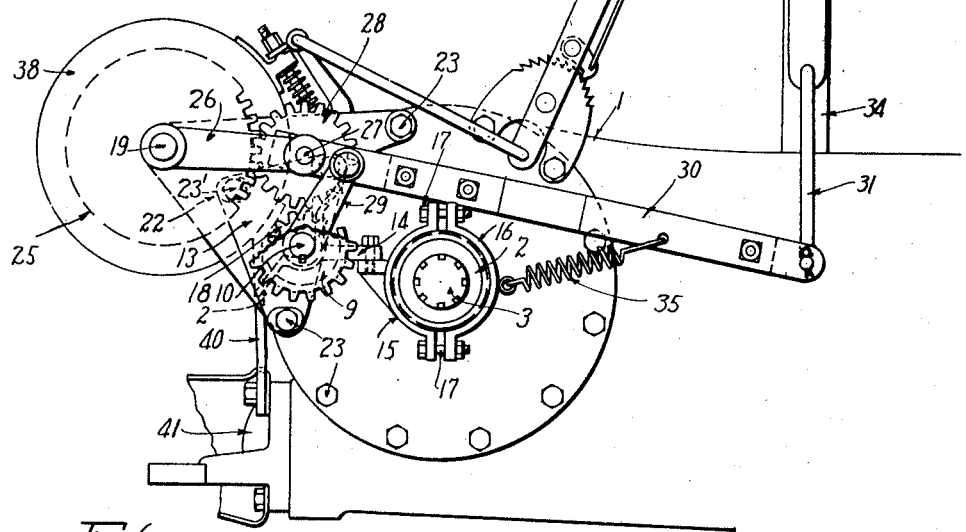
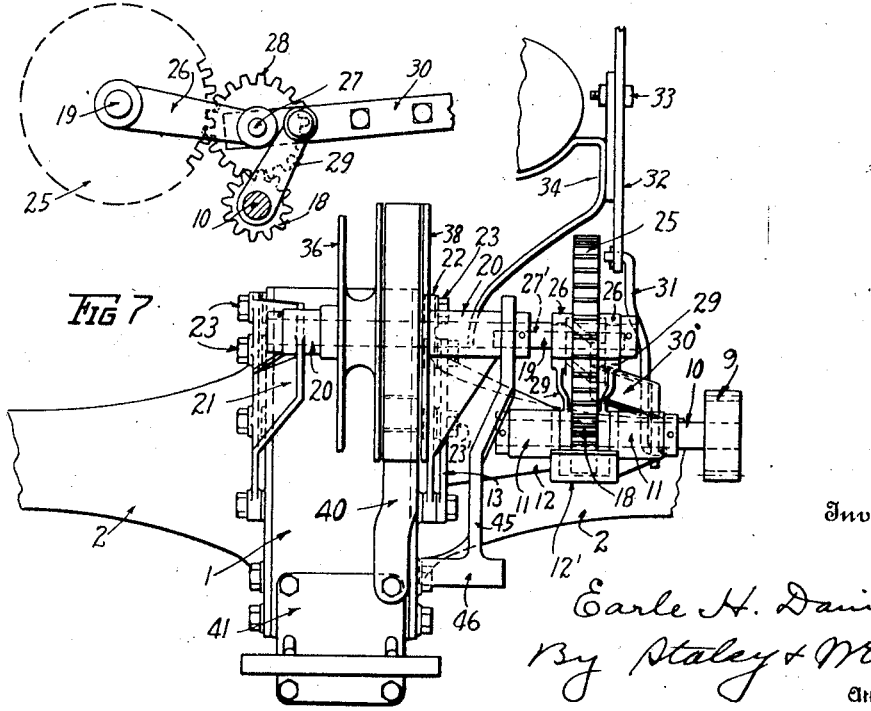
Inventor
Earle H. Daniel
By Staley & Welch
Attorneys Patented Nov. 12, 1929

1,735,422

UNITED STATES PATENT OFFICE

EARLE H. DANIEL, OF SPRINGFIELD, OHIO

POWER LIFT FOR TRACTORS

Application filed March 12, 1928. Serial No. 261,093.

This invention relates to power lifting devices, it particularly relating to a power lifting device adapted for attachment to tractors for lifting a farm implement drawn by the tractor, it especially relating to improvements on the device described in my pending application Serial No. 203,547, filed July 5, 1927.

One of the objects of the invention is to provide improved means for throwing the power lifting device into and out of operation.

Another object of the invention is to provide improved means for supporting the power lifting device from the tractor.

In the accompanying drawings:

Fig. 1 is a top plan view of the rear portion of a tractor showing my improved power lifting device applied thereto.

Fig. 2 is a section on the line 2—2 of Fig. 1.

Fig. 3 is a section on the line 3—3 of Fig. 1 with some of the operating parts omitted.

Fig. 4 is a section on the line 4—4 of Fig. 1.

Fig. 5 is a side elevation of the parts shown in Fig. 1, with the tractor wheel removed showing the gearing in inoperative position.

Fig. 6 is a side elevation of a portion of the devices shown in Fig. 5 with the drive shaft in section showing the gearing in operative position.

Fig. 7 is a rear end elevation of the differential housing and a portion of its extension and the power lifting device.

Referring to the drawings, 1 represents the differential housing, 2 the extensions therefrom, 3 one of the drive axles and 4 the tractor wheels. One of the tractor wheels has secured to the hub 5 and spokes 6 thereof a ring 7 having an internal gear 8 as shown more fully in my application referred to. Meshing with this gear is a pinion 9 which is fast to a shaft 10 journaled in a pair of bearings 11, which are formed integrally with the horizontal web-like portion 12 of a bracket and a curved extension 12' therefrom; the vertical portion 13 of the bracket being supported by the differential housing in the manner later explained. The outer bearing 11 has integrally formed therewith a forwardly extending ear 14 which has integrally formed with the rear end thereof one member of a clamp 15 cooperating with a clamp member 16 clamped together by machine bolts 17 about one of the extensions 2.

The shaft 10 has secured thereto a gear 18 which rotates continuously when the tractor is moving.

Arranged parallel with the shaft 10 is a winding shaft 19, this shaft being journaled in bearings 20 arranged respectively at the rear end of a pair of brackets 21 and 22. These brackets are secured to the differential housing 1 by cap screws 23 which enter the same holes as the cap screws which were employed to secure the extensions 2 to the housing 1. The vertical portion 13 of the bracket which supports the drive shaft 10 is also secured in position by these same cap screws and in addition is secured to the bracket 22 by an additional cap screw 23' as shown in Fig. 3, this vertical portion 13 being provided with slotted openings 24 through which the cap screws pass to allow for the necessary adjustment.

Fast to the winding shaft 19 is a gear 25 and loosely mounted on this shaft are two parallel arms 26, one on each side of the gear. The free ends of these arms carry a short shaft 27 to which is fast a gear 28 permanently in mesh with the gear 25, this gear 28 being arranged in vertical alignment with the gear 18 on the drive shaft 10. Loosely mounted upon the shaft 10 are two links 29, one on each side of the gear 18. A lever is indicated at 30, this lever having its rear bifurcated end pivotally connected with the shaft 27 and also pivotally connected with the free ends of the links 29, the two pivotal connections being in comparatively close proximity. This lever 30 is connected by a link 31 to the lower end of a hand lever 32 pivoted at 33 to a suitable frame part 34. The pivotal connection with the links constitutes a movable fulcrum for the lever so that when the forward end of the lever is depressed the rear portion will be elevated and when the forward end of the lever is raised the rear end will be depressed so as to move the gear 28 into engagement (as shown in Fig. 6)

with the gear 18 to thereby cause rotation of the winding shaft 19 when the tractor is in motion, and depressing the forward end of the lever 30 raises the rear end to separate these gears 18 and 28 as shown in Fig. 5. A spring 35 having one end connected to the lever and the other to one of the extensions 2 acts to normally hold the gears in disengaged position.

Fast to the shaft 19 is a winding drum 36 upon which winds a chain 37, the free end of which is secured in any suitable way to the implement to be lifted. Loose upon the shaft 19 is a brake drum 38 with the periphery of which cooperates a brake band 39, the end of which is connected with a standard 40 secured to and projecting up from the draw-bar cap 41 and the other end of which is connected with a hand lever 42 whereby the band may be tightened upon the brake drum. The winding drum has a pivoted pawl 43 which cooperates with ratchet teeth 44 carried by the web of the brake drum.

Means are provided for automatically disengaging the gears 18 and 28 at the limit of the raising movement of the mechanism. Pivoted upon the shaft 19 is a lever 45 which is provided with a foot 46 which stands in the path of movement of some part of the implement which is drawn by the tractor. The other end of the lever is provided with a notched end which straddles an extended portion 27' of the shaft 27 so that when the lever is rocked by the contact with the implement the gear 28 will be disengaged from the gear 14.

The operation is as follows: In the normal position of the parts the gears 18 and 28 are out of mesh, the spring 35 normally tending to hold the gear 28 away from the gear 18. If it is now desired to raise the implement attached to the chain 37, the operator first tightens the brake band on the brake drum, throws the gear 28 into mesh with the gear 18, assuming the tractor is in motion, which will rotate the shaft 19 and cause the chain to wind upon the drum to raise the implement, the pawl of the winding drum ratcheting over the ratchet teeth of the brake drum. When the implement has been raised to the desired height the operator disengages the gears 18 and 28 by a movement of the lever 32 and the implement is held in raised position by the cooperation of the pawl and ratchet teeth. The operator also may control the lowering movement of the implement by means of the brake band. If the operator should fail to manipulate the lever 32 at the proper time the lever 45 will operate automatically in the manner before described to disengage the gears.

Having thus described my invention, I claim:

1. In a power lift attachment for tractors, the combination of a winding shaft, a driven gear thereon, a drive shaft, a drive gear thereon, an intermediate gear permanently in mesh with said winding shaft gear and mounted to swing about the axis thereof, an operating lever having a pivotal connection at the axis of said intermediate gear, and a pivoted support for said lever movable about the axis of said drive gear.

2. In a power lift attachment for tractors, a winding shaft, a gear fixed thereto, a drive shaft, a drive gear fixed thereto, an intermediate gear arranged to swing about the axis of said winding gear and permanently in mesh therewith, a support pivotally mounted on said drive shaft, an operating lever pivotally connected with the free end of said support, and a pivotal connection between said lever and the axis of said intermediate gear.

3. In a power lift attachment for tractors, a winding shaft, a gear fixed thereon, a drive shaft, a gear fixed thereto, a pair of arms pivoted on said winding shaft and embracing the gear thereon, an intermediate shaft carried by the rear ends of said arms, an intermediate gear on said intermediate shaft permanently in mesh with said winding gear, a pair of links pivotally mounted on said drive shaft and embracing said driving gear, and an operating lever pivotally connected with the free ends of said links and also pivotally connected with said intermediate shaft.

4. In a power lift attachment for tractors, the combination of a tractor wheel, an internal gear, a pinion engaged with said gear, a transversely arranged driving shaft with which said pinion is connected, a spur gear fixed to said driving shaft, a winding shaft arranged parallel to said driving shaft, a spur gear on said winding shaft in line with said driving gear, an intermediate spur gear permanently in mesh with said winding gear and mounted to swing about the axis thereof, an operating lever, a pivoted fulcrum for said operating lever, and a pivotal connection between said lever and the axis of said intermediate gear.

5. In a power lift attachment for tractors, the combination with the differential housing and extensions therefrom, of a pair of brackets secured to said differential housing, a winding shaft supported by said brackets, a third bracket secured to said housing and projecting laterally therefrom and also having a connection with one of said extensions, a driving shaft carried by said third bracket in parallel relation with said winding shaft, driving gears between said shafts, and means for engaging and disengaging said gears.

In testimony whereof, I have hereunto set my hand this 1st day of March, 1928.

EARLE. H. DANIEL.